United States Patent
Miura et al.

(10) Patent No.: US 8,485,927 B2
(45) Date of Patent: Jul. 16, 2013

(54) POWER TRANSMISSION CHAIN AND POWER TRANSMISSION DEVICE

(71) Applicant: JTEKT Corporation, Osaka (JP)

(72) Inventors: Yoshihisa Miura, Nara (JP); Teruko Nakazano, Suita (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 0 days.

(21) Appl. No.: 13/682,564

(22) Filed: Nov. 20, 2012

(65) Prior Publication Data

US 2013/0079183 A1 Mar. 28, 2013

Related U.S. Application Data

(62) Division of application No. 12/448,045, filed as application No. PCT/JP2007/073713 on Dec. 7, 2007, now abandoned.

(30) Foreign Application Priority Data

Dec. 8, 2006 (JP) .................................. 2006-331289
Dec. 20, 2006 (JP) .................................. 2006-342028

(51) Int. Cl.
*F16G 13/06* (2006.01)

(52) U.S. Cl.
USPC ........................................................ 474/206

(58) Field of Classification Search
USPC ..................... 474/202, 206, 213, 237, 245
See application file for complete search history.

(56) References Cited

U.S. PATENT DOCUMENTS

| 5,192,252 | A | 3/1993 | Skurka et al. |
| 5,453,059 | A | 9/1995 | Avramidis et al. |
| 5,651,746 | A | 7/1997 | Okuda |
| 6,293,887 | B1 | 9/2001 | Linnenbrugger et al. |
| 7,306,532 | B2 | 12/2007 | Hubertus Maria van Rooij et al. |

(Continued)

FOREIGN PATENT DOCUMENTS

| EP | 0 194 037 A1 | 9/1986 |
| EP | 1 845 286 A1 | 10/2007 |

(Continued)

OTHER PUBLICATIONS

European Search Report dated Jul. 28, 2011.

(Continued)

*Primary Examiner* — William E Dondero
*Assistant Examiner* — Mark K Buse
(74) *Attorney, Agent, or Firm* — McGinn IP Law Group, PLLC

(57) ABSTRACT

A power transmission chain includes a plurality of links respectively having front and rear insertion parts into which pins are inserted, a plurality of first pins and a plurality of second pins which are arranged in front and back for connecting the links. A plurality of the links includes two types of the links having different pitch lengths, wherein provided that a radius of a pulley shaft is RA, a radius of curvature of a face of the link having a shorter pitch length at an inner diameter side of the chain is RS, and a radius of curvature of a face of the link having a longer pitch length at an inner diameter side of the chain is RL, relation is set to be $RA \leqq RS \leqq 1.5RA$, and $RS < RL$.

1 Claim, 7 Drawing Sheets

U.S. PATENT DOCUMENTS

| | | |
|---|---|---|
| 7,806,794 B2 | 10/2010 | Fuse |
| 7,874,952 B2 | 1/2011 | Tada et al. |
| 7,892,127 B2 | 2/2011 | Tada et al. |
| 7,963,872 B2 * | 6/2011 | Tohara et al. .................. 474/212 |
| 2010/0035713 A1 | 2/2010 | Miura et al. |

FOREIGN PATENT DOCUMENTS

| | | |
|---|---|---|
| EP | 1 944 525 A1 | 7/2008 |
| JP | 2000-230606 A | 8/2000 |
| JP | 2006-2783 A | 1/2006 |
| JP | 2006-2784 A | 1/2006 |
| JP | 2006-97844 A | 4/2006 |
| JP | 2006-170314 A | 6/2006 |
| JP | 2006-214508 A | 8/2006 |

OTHER PUBLICATIONS

Japanese Notification of Reasons for Refusal in the Japanese Patent Application Publication No. JP 2006-342028 dated May 10, 2012, with English-language translations.

Japanese Notification of Reasons for Refusal in the Japanese Patent Application Publication No. JP 2006-331289 dated May 10, 2012, with English-language translations.

* cited by examiner

FIG. 8(a)
FIG. 8(b)
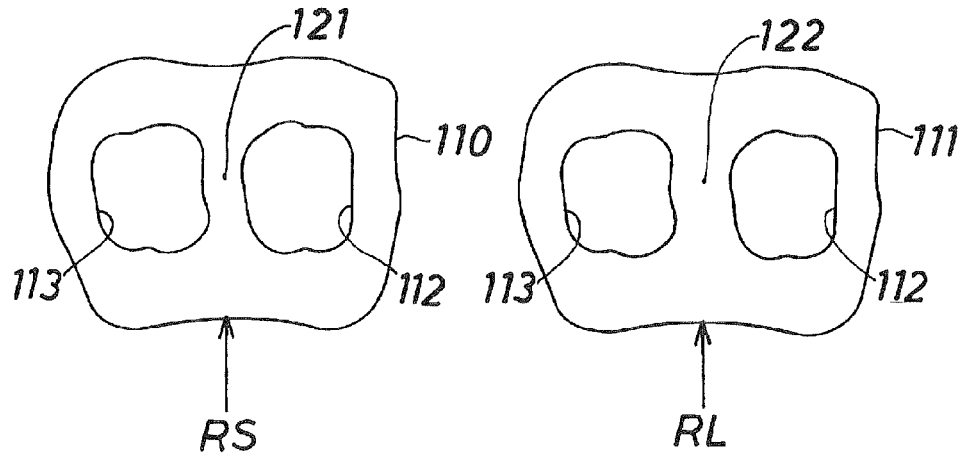
FIG. 9
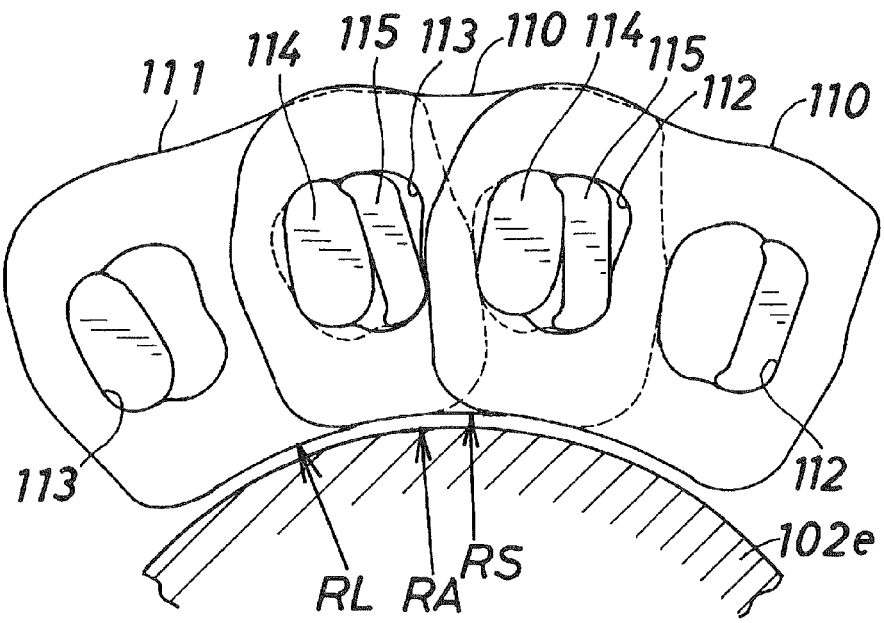

POWER TRANSMISSION CHAIN AND POWER TRANSMISSION DEVICE

The present application is a Divisional application of U.S. patent application Ser. No. 12/448,045, filed on Jun. 5, 2009, the entirety of which is incorporated herein by reference.

The present application claims priority from Japanese Application No. 2006-331289 and Japanese Application No. 2006-342028, the entirety of each of which are incorporated herein by reference.

TECHNICAL FIELD

The present invention relates to a power transmission chain, and more particularly, to the power transmission chain which is favorably used in a continuously variable transmission (CVT) in a vehicle such as an automobile, and a power transmission device provided with the same.

BACKGROUND ART

As the continuously variable transmission for an automobile, a device which includes, as shown in FIG. 12, a drive pulley 2 having a fixed sheave 2a and a movable sheave 2b and provided at an engine side, a driven pulley 3 having a fixed sheave 3b and a movable sheave 3a and provided at a drive wheel side, and an endless power transmission chain 1 suspended between both the drive pulley and the driven pulley has been known. In this device, the movable sheaves 2b, 3a are moved close to or away from the fixed sheaves 2a, 3b, whereby the chain 1 is clamped with hydraulic pressure, and a contact load is generated between the pulleys 2, 3 and the chain 1 with a clamping force on this occasion, thereby to transmit a torque with a friction force in a contact part.

As the power transmission chain, there is disclosed in Patent Document 1, a power transmission chain including a plurality of links respectively having front and rear insertion parts into which pins are inserted, a plurality of first pins and a plurality of second pins for connecting the links which are arranged in a lateral direction of the chain, such that the front insertion part of one of the links is opposed to the rear insertion part of the other link so that the links can be flexed with respect to each other in a longitudinal direction. In this power transmission chain, the first pin which is fixed to the front insertion part of the one link and movably fitted into the rear insertion part of the other link and the second pin which is movably fitted into the front insertion part of the one link and fixed to the rear insertion part of the other link are relatively moved in rolling contact with each other, whereby the links can be flexed with respect to each other in the longitudinal direction. In this Patent Document 1, it is proposed to provide two or more types of pitch lengths of the links, shapes of rolling contact faces of the pins, contact positions of the pins with respect to a pulley face (offset amounts), and so on, for the purpose of reducing noise and vibration.

Patent Document 1: Japanese Patent Publication No. JP-A-2006-097844

DISCLOSURE OF THE INVENTION

Problems that the Invention is to Solve

In the power transmission chain disclosed in the above described Patent Document 1, in case where two types of the shapes of the rolling contact faces of the pins and two types of the offset amounts are provided, four types of the pins including all these combinations are used. However, because both the shape of the rolling contact face of the pin and the offset amount affect the shape of an end face of the pin to be contacted with the pulley face, there is such possibility that use of all the four types will not be the best combination for reducing noises and vibrations.

Moreover, in the continuously variable transmission using the power transmission chain as disclosed in the aforesaid Patent Document 1, a clearance is set between the links of the chain and the pulley shaft so that interference may not occur between the links and the pulley shaft. However, there is such possibility that when a large force is exerted on the chain under some situation, the links may interfere with the pulley shaft, and consequently, a large stress may occur in the links.

It is an object of the invention to provide a power transmission chain in which noises and vibrations are further reduced, by modifying a shape of a rolling contact face and an offset amount of a pin which would affect a contact shape of an end face of the pin, and a power transmission device provided with the same. It is another object of the invention to provide a power transmission chain in which concentration of stress on links can be avoided, even in case where interference occurs between the links and a pulley shaft, and a power transmission device provided with the same.

Means for Solving the Problems

According to one aspect of the invention, there is provided a power transmission chain comprising a plurality of links respectively having front and rear insertion parts into which pins are inserted, a plurality of first pins and a plurality of second pins which are arranged in front and back for connecting the links which are arranged in a lateral direction of the chain such that the front insertion part of one of the links is opposed to the rear insertion part of the other link, the first pins and the second pins being relatively moved in rolling contact with each other, whereby the links can be flexed with respect to each other in a longitudinal direction, wherein a rolling contact face of either one of the first pin and the second pin is formed as an involute curve, and a rolling contact face of the other is formed as a flat face, characterized in that the pin of which the rolling contact face is formed as the involute curve includes two types having different radiuses Rb of the involute curve, two types of offset amounts are set with respect to a shape of an end face of the pin to be contacted with a conical face of a pulley, and relation between a larger radius Rb and a smaller radius Rb of the involute curve and a larger offset amount and a smaller offset amount with respect to the pin is limited to either of three combinations, namely, the larger Rb—the larger offset, the larger Rb—the smaller offset, and the smaller Rb—the smaller offset.

The pulley face is conical in shape, for example, and its inclination angle is 11°, for example. The end face of the pin is formed as a curved face having an inclination angle corresponding to the pulley face. As the results, "a center" of the pin means inclusively a center in a sectional shape (a drawing center), and a center in a region where the end face is contacted with the pulley (a drawing center in a contact region, hereinafter referred to as "a contact center point"). A difference between them is called as an offset amount. It is possible to set different values of the offset amounts with respect to the pins having the same sectional shape, by changing a grinding amount or so on occasion of working the end faces of the pins. The pins having the different offset amounts contribute to dispersion of energy of sounds to different frequency zones, by shifting cycles of striking sounds, whereby a peak of sound pressure level is lowered, and noises and vibrations can be reduced.

In case of the smaller offset, preferably, there is no offset (the contact center point corresponds to the center of the sectional shape), and in case of the larger offset, the contact center point is moved to an outer diameter side of the chain.

According to another aspect of the invention, there is provided a power transmission chain comprising a plurality of links respectively having front and rear insertion parts into which pins are inserted, a plurality of first pins and a plurality of second pins which are arranged in front and back for connecting the links which are arranged in a lateral direction of the chain such that the front insertion part of one of the links is opposed to the rear insertion part of the other link, the first pins and the second pins being relatively moved in rolling contact with each other, whereby the links can be flexed with respect to each other in a longitudinal direction, the power transmission chain being suspended between a pair of pulleys, characterized in that a plurality of the links includes two types of the links having different pitch lengths, wherein provided that a radius of a pulley shaft is RA, a radius of curvature of a face of the link having a shorter pitch length at an inner diameter side of the chain is RS, and a radius of curvature of a face of the link having a longer pitch length at an inner diameter side of the chain is RL, relation is set to be RA≦RS≦1.5RA, and RS<RL.

A peripheral edge part of each of the links is formed in a smooth curve so that stress concentration may not occur. Usually, there is a clearance between the link of the chain and the pulley shaft, and interference with the pulley is not taken into consideration in designing the shape of the link at the inner diameter side of the chain. In the prior art, the radius of the curvature is RS<RA. Therefore, in the prior art, when the link of the chain interferes with the pulley shaft, the link come into contact with the pulley shaft at two points, and a bending moment which is likely to generate stress concentration may be exerted on the link. On the other hand, by securing the aforesaid condition, the link comes into contact at one point, and the bending moment will not be exerted on the link. Therefore, the entire link moves in a direction of a force, and strong interference between the link of the chain and the pulley shaft can be avoided.

It is possible, in one feature of the invention, that a contact face of either one of the first pin and the second pin is formed as a flat face, while the contact face of the other is formed as an involute curved face capable of making relative rolling contact with each other. The pin having the rolling contact face of the involute curve (hereinafter, referred to as "the first pin" or "the pin") transmits power with a friction force, when the end face thereof is brought into contact with the conical sheave face of the pulley in the continuously variable transmission. The other pin is not brought into contact with the pulley (called as an inter piece or a strip, and hereinafter, referred to as "the second pin" or "the inter piece"). The second pin is preferably smaller in width than the first pin, and in this case, projecting edge portions may be sometimes provided at upper and lower edges of the second pin. It is also possible that the respective contact faces of the first pin and the second pin are formed as curve faces of required shapes.

The above described power transmission chain is preferably such a chain that the end face of the longer pin is contacted with the conical sheave face of the pulley in the continuously variable transmission, and the power is transmitted with the friction force of this contact.

It would be preferable that one of the first pin and the second pin is fixed to a pin fixing part which is provided in a front part of the front insertion part of one of the links and movably fitted into a pin movable part which is provided in a front part of the rear insertion part of the other link, while the other of the first pin and the second pin is movably fitted into a pin movable part which is provided in a back part of the front insertion part of the one link and fixed to a pin fixing part which is provided in a back part of the rear insertion part of the other link.

The pin is fixed to the pin fixing part by mechanical press fitting, for example, in engagement fixing between an inner edge of the pin fixing part and an outer peripheral face of the pin, but alternatively, may be fixed by shrinkage fit or cooling fit. The engagement fixing is preferably made at edges of a part of the pin fixing part perpendicular to a longitudinal direction (upper and lower edges). After the engagement fixing, pre-tension is applied in a pre-tension applying step, whereby appropriate remaining compression stress is equally applied to the pin fixing part (a pin press-fitting part) of the link.

The link is formed of spring steel or carbon tool steel, for example. Material for the link is not limited to the spring steel or the carbon tool steel, but may be other steel such as bearing steel. The front and rear insertion parts of the link may be found as through holes independent from each other (a link having a pillar), or as a single through hole (a link having no pillar). As material for the pin, adequate steel such as bearing steel may be used.

Although one end side of the link in the longitudinal direction is referred to as a front side, and the other end side is referred to as a back side, in the description, the front and back is used only for convenience. It does not mean that the longitudinal direction of the link always corresponds to a front and back direction.

The pulley includes a fixed sheave having a conical sheave face, and a movable sheave having a conical sheave face which is opposed to the sheave face of the fixed sheave, and the chain is clamped between the sheave faces of the two sheaves. When the movable sheave is moved by a hydraulic actuator, a distance between the sheave faces in the continuously variable transmission, accordingly, a winding radius of the chain is varied, and hence, continuous variable transmission can be performed in smooth movement.

A power transmission device according to the invention includes a first pulley having a conical sheave face, a second pulley having a conical sheave face, and a power transmission chain suspended between the first and second pulleys, wherein the power transmission chain is the above described power transmission chain.

This power transmission device is favorably used as a continuously variable transmission in a vehicle such as an automobile.

Advantage of the Invention

According to the power transmission device of this invention, reduction of noises and vibrations can be achieved, because the pin of which the rolling contact face is formed as the involute curve includes two types having the different radiuses Rb of the involute curve, and two types of the offset amounts are set. Further, relation between the larger radius Rb and the smaller radius Rb of the involute curve and the larger offset amount and the smaller offset amount with respect to the pin is limited to either of the three combinations, namely, the larger Rb—the larger offset, the larger Rb—the smaller offset, and the smaller Rb—the smaller offset. Therefore, a contact region of the pin is prevented from protruding out of the sectional shape of the pin, and an extreme increase of face pressure, accordingly, concentration of stress is prevented. As the results, it is possible to reliably obtain the above described advantage of reducing noises and vibrations, and at the same time, it is possible to enhance durability of the chain.

According to the power transmission device of this invention, reduction of noises can be achieved by using two types of the links having the different pitch lengths. Further, by considering a shape of the face of the link at the inner diameter side of the chain, stress concentration of the link at a time when the link interferes with the pulley shaft can be prevented, and hence, durability of the chain can be enhanced.

BRIEF DESCRIPTION OF THE DRAWINGS

FIGS. 8(a) and 8(b) are enlarged side views showing two types of the links.

FIG. 9 is a side view showing the power transmission chain in a state mounted to a pulley.

BEST MODE FOR CARRYING OUT THE INVENTION

First Embodiment

Figure 1:
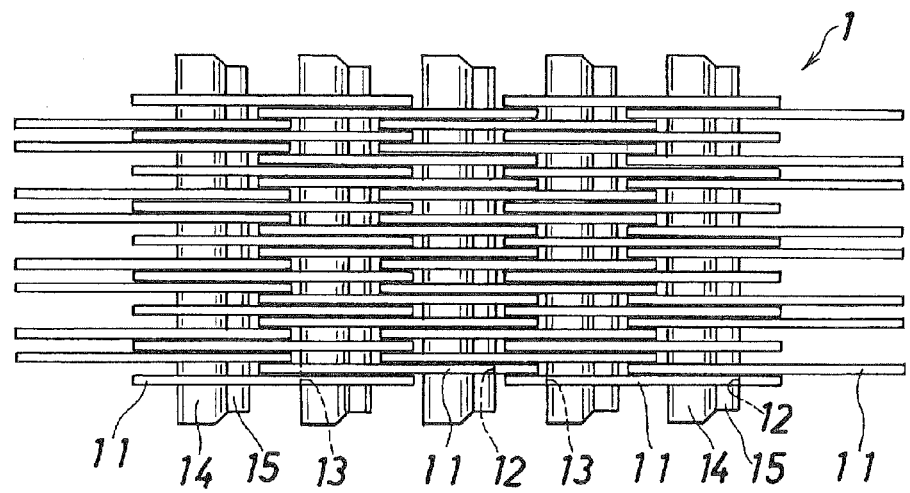
FIG. 1 is a plan view showing a part of a power transmission chain in a first embodiment according to the invention.

Now, a first embodiment of the invention will be described referring to the drawings. It is to be noted that "upside and downside" in the following description correspond to upside and downside in FIG. 2.

FIG. 1 shows a part of the power transmission chain according to the invention. A power transmission chain 1 includes a plurality of links 11 each having front insertion parts 12 and rear insertion parts 13 which are provided at determined intervals in a longitudinal direction of the chain, and a plurality of pins (first pins) 14 and a plurality of inter pieces (second pins) 15 for connecting the links 11 which are arranged in a lateral direction of the chain to one another so as to be flexed in the longitudinal direction. The inter pieces 15 are formed shorter than the pins 14, and they are opposed to each other such that the inter pieces 15 are arranged at a front side and the pins 14 are arranged at a back side.

The chain 1 is constructed as follows. One link unit is formed by arranging three link rows in a direction of travel (a back and forth direction), each of the link rows including a plurality of links in the same phase in a lateral direction, and a plurality of the link units each having these three link rows are coupled in the direction of travel. In this embodiment, one link row having nine sheets of the links and two link rows each having eight sheets of the links constitute the one link unit.

Figure 2:
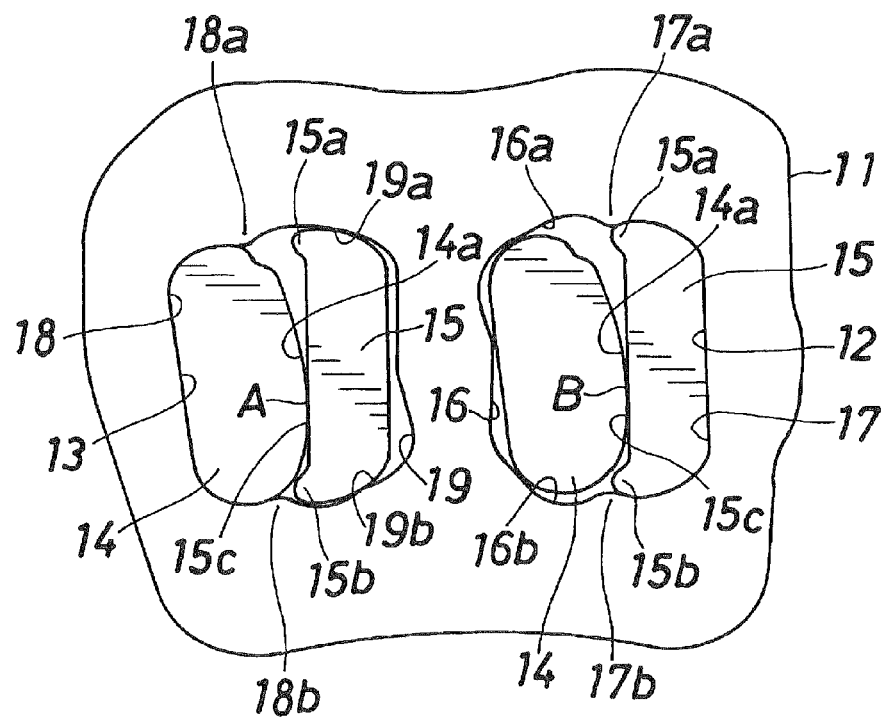
FIG. 2 is an enlarged side view of a link.

As shown in FIG. 2, the front insertion part 12 of the link 11 has a pin movable part 16 to which the pin 14 is movably fitted and an inter piece fixing part 17 to which the inter piece 15 is fixed. The rear insertion part 13 has a pin fixing part 18 to which the pin 14 is fixed, and an inter piece movable part 19 to which the inter piece 15 is movably fitted.

Each of the pins 14 is larger in width in the back and forth direction as compared with the inter piece 15. The inter piece 15 is provided, at its upper and lower edges, with projecting edge portions 15a, 15b which are projected toward the pin 14.

In FIG. 2, reference signs A and B represent lines (points in a sectional view) where the pin 14 is in contact with the inter piece 15 in a rectilinear part of the chain 1, and a distance between A and B is a pitch.

On occasion of coupling the links 11 which are arranged in the lateral direction of the chain, the links 11 are superposed on one another such that the front insertion part 12 of one of the links 11 is opposed to the rear insertion part 13 of the other link 11. Then, the pin 14 is fixed to the rear insertion part 13 of the one link 11 and movably fitted to the front insertion part 12 of the other link, while the inter piece 15 is movably fitted to the rear insertion part 13 of the one link 11 and fixed to the front insertion part 12 of the other link 11. When the pins 14 and the inter pieces 15 relatively move in rolling contact with each other, the links 11 can be flexed to each other in a longitudinal direction thereof (in the back and forth direction).

In a boarder part between the pin fixing part 18 and the inter piece movable part 19 of the link 11, there are provided upper and lower convex arc-shaped holding parts 18a, 18b for holding the pin 14 which is fixed to the pin fixing part 18. These convex arc-shaped holding parts 18a, 18b are respectively continued to upper and lower concave arc-shaped guide parts 19a, 19b of the inter piece movable part 19. In the same manner, in a boarder part between the inter piece fixing part 17 and the pin movable part 16, there are provided upper and lower convex arc-shaped holding parts 17a, 17b for holding the inter piece 15 which is fixed to the inter piece fixing part 17. These convex arc-shaped holding parts 17a, 17b are respectively continued to upper and lower concave arc-shaped guide parts 16a, 16b of the pin movable part 16.

An orbit of a contact position between the pin 14 and the inter piece 15 on the basis of the pin 14 is formed as an involute of circle. In this embodiment, a rolling contact face 14a of the pin 14 has an involute shape having a basic circle of a radius Rb and a center M, in a sectional view, and a rolling contact face 15c of the inter piece 15 is formed as a flat face (a rectilinear line in a sectional view). Accordingly, when the links 11 are shifted from a rectilinear part to a curved part of the chain 1 or from the curved part to the rectilinear part, in the front insertion part 12, the pin 14 moves within the pin movable part 16 with respect to the inter piece 15 in a fixed state, while its rolling contact face 14a is kept in rolling contact (including a small sliding contact) with a rolling contact face 15c of the inter piece 15. In the rear insertion part 13, the inter piece 15 moves within the inter piece movable part 19 with respect to the pin 14 in a fixed state, while its rolling contact face 15c is kept in rolling contact (including a small sliding contact) with the rolling contact face 14a of the pin 14.

In the above described power transmission chain 1, multangular vibrations occur due to repeated vertical movements of the pin, which is a factor responsible for noises. However, in this embodiment, because the pin 14 and the inter piece 15 relatively move in rolling contact with each other, and the orbit of the contact position between the pin 14 and the inter piece 15 on the basis of the pin 14 has the involute of circle, the vibrations can be made smaller as compared with a case where both the rolling contact faces of the pin and the inter piece are formed as arc-shaped faces. As the results, it is possible to reduce noises.

In order to further reduce noises and vibrations, it would be preferable that two or more types of the links 11 and pins 14 having different shapes may be randomly arranged. In this manner, cycles of generating striking sounds are shifted, and energy of the sounds is dispersed to different frequency zones, whereby a peak of sound pressure level is lowered.

The end face of the pin 14 to be brought into contact with the conical sheave faces 2c, 2d of the pulley 2 is formed as an appropriate curved face, by crowning work, for example. As for a contact center point, an adequate offset amount can be set at a time of working, and therefore, it is possible to reduce noises and vibrations, by setting this offset amount at two types of values.

Figure 3:
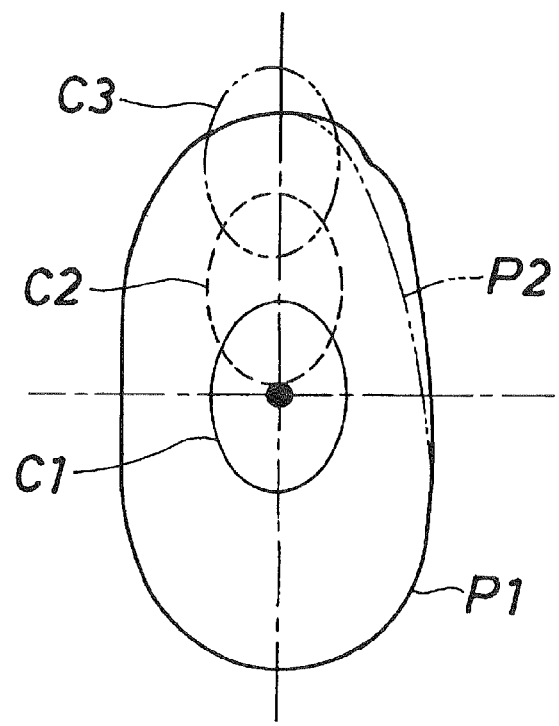
FIG. 3 is a view for explaining a sectional shape of a pin and a contact shape of an end face of the pin.

A pin P1 which is shown by a solid line in FIG. 3 has a contact region C1 as shown by a solid line in FIG. 3, in case where the offset amount is 0. In case where the contact center point is shifted outward in a radial direction of the chain, by increasing the offset amount, a contact region C2 as shown by a dotted line in FIG. 3 is obtained. Since the contact regions C1, C2 are smaller than a sectional area of the pin P1, usually, the contact regions C1, C2 will not protrude from the sectional shape of the pin P1. However, in a pin P2 in which a radius of an involute curve is made smaller, as shown by a two-dot chain line in FIG. 3, in case where the contact center point is remarkably shifted outward in a radial direction of the chain, its contact region C3 may happen to protrude from the sectional shape of the pin P2.

Figure 4A:
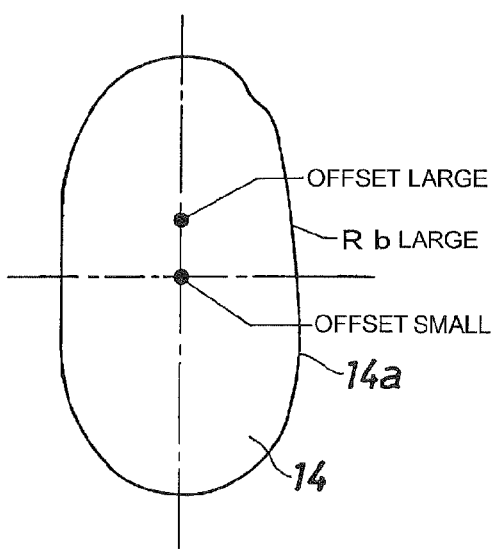
FIGS. 4(a) and 4(b) are views showing a shape of the pin which is employed in this invention.
Figure 4B:
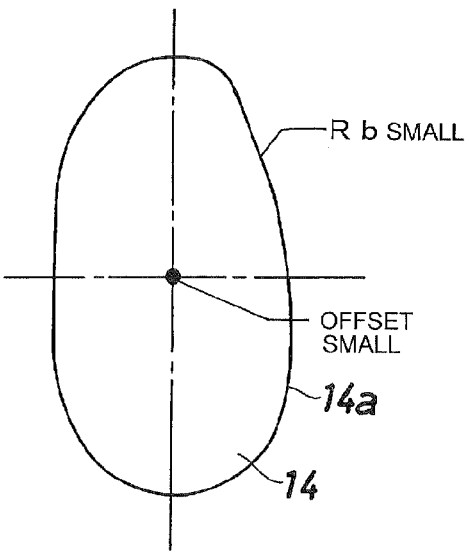

Therefore, in the power transmission chain according to the invention, two types of the pins 14, one having a larger radius Rb of the involute curve as shown in FIG. 4(a), and the other having a smaller radius Rb of the involute curve as shown in FIG. 4(b) are used, and two types of the offset amounts are set as for the shape of the end face of the pin 14. Although four types (2×2=4) of combinations can be obtained in this case, a combination of the smaller Rb the larger offset out of the four types of the combinations is not used. The combination between the larger and smaller radiuses Rb of the involute curve and the larger and smaller offset amounts for the pin 14 is limited to either of the three combinations, namely, the larger Rb the larger offset, the larger Rb the smaller offset, and the smaller Rb the smaller offset.

In other words, out of the four types of the combinations, the combination having the largest possibility that the contact region of the end face of the pin may protrude from the sectional shape of the pin is excluded. Therefore, even in case where the radius of the involute curve has been changed, or a curvature of the end face of the pin has been changed, an extreme increase of a face pressure (concentration of stress) occurring due to protrusion of the contact region of the end face of the pin from the sectional shape of the pin is prevented, and hence, such drawback that durability is deteriorated, and noises and vibrations are increased is reliably prevented. Moreover, because the three combinations of the pins 14 are randomly arranged, noise and vibration reducing effects are further enhanced.

This power transmission chain 1 can be produced by press fitting the links 11 one by one or several sheets in lump, after the pins 14 and the inter pieces 15 of a required number have been vertically held on a table. This press fitting is conducted between the upper and lower edges of the pin 14 and the inter piece 15, and the upper and lower edges of the pin fixing part 18 and the inter piece fixing part 17, and a press fitting allowance is 0.005 mm to 0.1 mm. A tension is applied (pretension) to the chain 1 which has been assembled in this manner.

Figure 5:
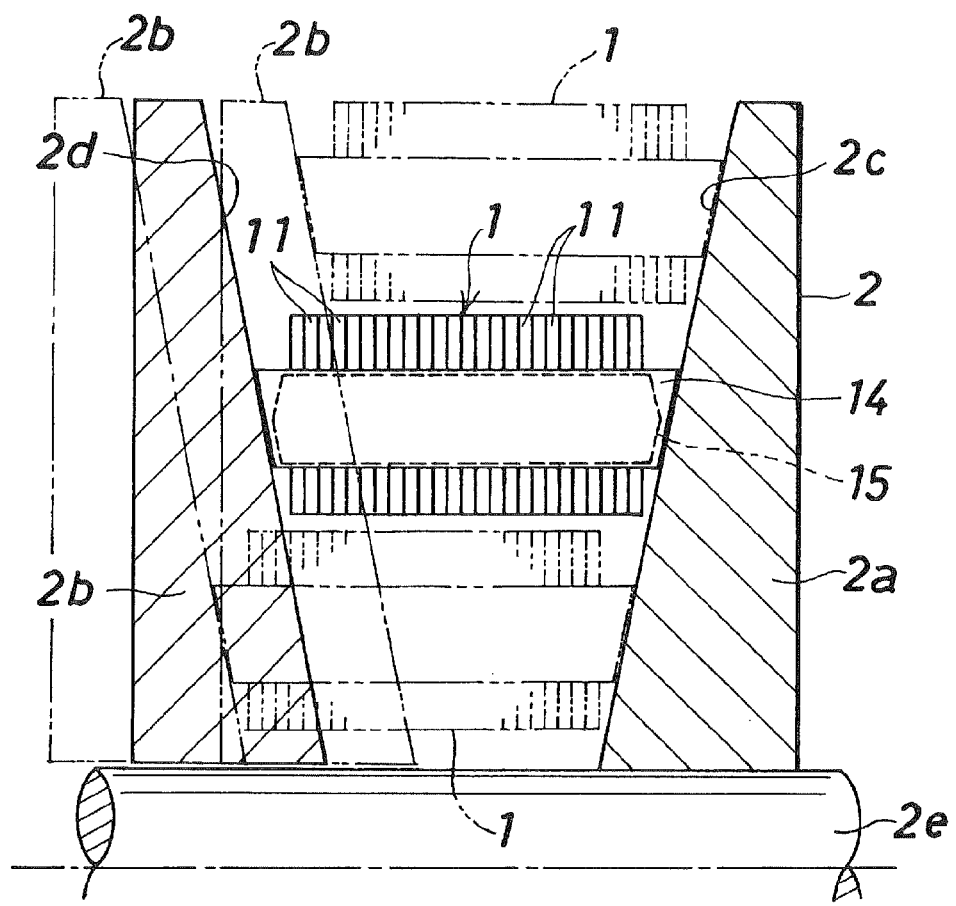
FIG. 5 is a front view showing the power transmission chain in a state mounted to a pulley.
Figure 12:
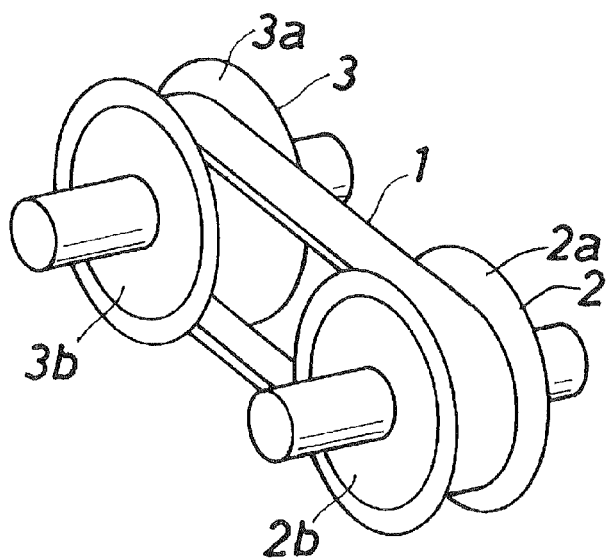
FIG. 12 is a perspective view showing a continuously variable transmission.

The above described power transmission chain is used in the CVT as shown in FIG. 12. On this occasion, in a state where the end face of the inter piece 15 is not in contact with the respective conical sheave faces 2c, 2d of the fixed sheave 2a and the movable sheave 2b of the pulley 2, as shown in FIG. 5, the end face of the pin 14 is brought into contact with the conical sheave faces 2c, 2d of the pulley 2, and the power is transmitted with friction force of this contact. Because the pin 14 and the inter piece 15 are guided by the respective movable parts 16, 19 to move in rolling contact, as described above, the pin 14 is hardly rotated with respect to the sheave faces 2c, 2d, and friction loss is reduced, whereby high power transmission rate can be secured. When the movable sheave 2b of the drive pulley 2 at a position shown by a solid line is moved close to and away from the fixed sheave 2a, a winding diameter of the chain 1 becomes larger when it has moved close to the fixed sheave 2a, and becomes smaller when it has moved away from the fixed sheave 2a, as shown by a chain line in FIG. 5. In the driven pulley 3, although not shown in the drawing, the movable sheave of the driven pulley 3 moves in an opposite direction to the movable sheave 2b of the drive pulley 2. When the winding diameter of the drive pulley 2 becomes larger, the winding diameter of the driven pulley 3 becomes smaller, and when the winding diameter of the drive pulley 2 becomes smaller, the winding diameter of the driven pulley 3 becomes larger. As the results, on the basis of a state where transmission ratio is 1:1 (an initial value), a state of U/D in which the winding diameter of the drive pulley 2 is the smallest and the winding diameter of the driven pulley 3 is the largest is obtained, and a state of O/D in which the winding diameter of the drive pulley 2 is the largest and the winding diameter of the driven pulley 3 is the smallest is obtained. It is to be noted that there is a slight clearance between the pulley shaft 2e and a face of the link 11 at an inner diameter side of the chain, even when the winding diameter is the smallest.

Although the type of the link 11 is not particularly described in the preceding description, two types of the links 11 having different pitch lengths can be used. Besides, it is of course possible to employ two types of the pins having different lengths or to combine other means for dispersing sounds.

Second Embodiment

Now, a second embodiment of the invention will be described referring to the drawings. It is to be noted that "upside and downside" in the following description correspond to upside and downside in FIG. 7.

Figure 6:
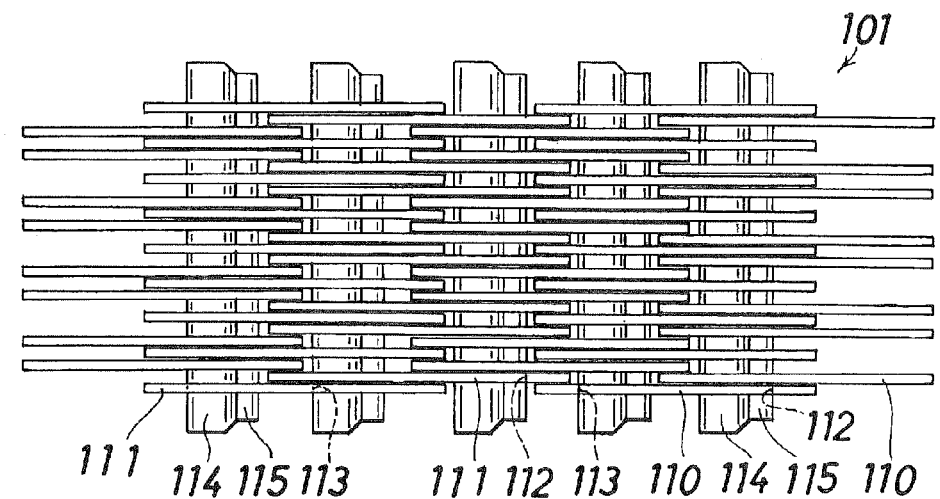
FIG. 6 is a plan view showing a part of a power transmission chain in a second embodiment according to the invention.

FIG. 6 shows a part of the power transmission chain according to the invention. A power transmission chain 101 includes a plurality of links 110, 111 each having front insertion parts 112 and rear insertion parts 113 which are provided at determined intervals in a longitudinal direction of the chain, a plurality of pins (first pins) 114 and a plurality of inter pieces (second pins) 115 for connecting the links 110, 111 which are arranged in a lateral direction of the chain to one another so as to be flexed in the longitudinal direction. The inter pieces 115 are formed shorter than the pins 14. They are opposed to each other such that the inter pieces 15 are arranged at a front side and the pins 14 are arranged at a back side.

In this chain, two types of the links 110, 111 having different pitch lengths are used. In the following description, the link having a smaller pitch length is called as a short pitch link 110, and the link having a larger pitch length is called as a long pitch link 111.

The chain 101 is constructed as follows. One link unit is formed by arranging three link rows in a direction of travel (a back and forth direction), each of the link rows including a plurality of links in the same phase in a lateral direction, and a plurality of the link units having these three link rows are coupled in the direction of travel. In this embodiment, one link row having nine sheets of the links and two link rows each having eight sheets of the links constitute the one link unit.

Figure 7:
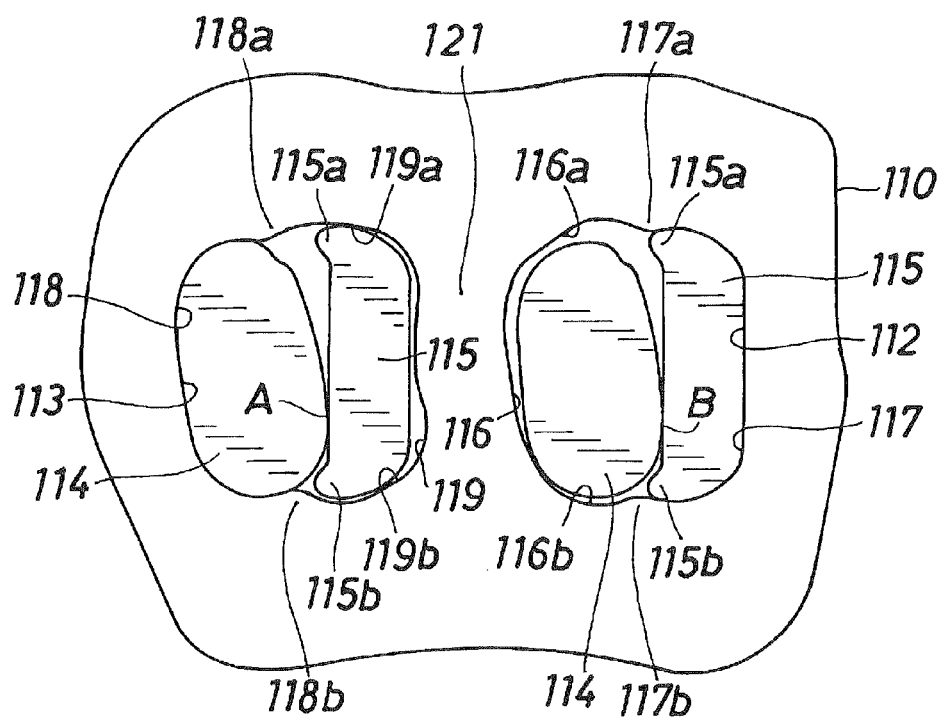
FIG. 7 is an enlarged side view of a link.

As shown in FIG. 7, the front insertion part 112 of the short pitch link 110 has a pin movable part 116 to which the pin 114 is movably fitted and an inter piece fixing part 117 to which the inter piece 115 is fixed. The rear insertion part 113 has a pin fixing part 118 to which the pin 114 is fixed, and an inter piece movable part 119 to which the inter piece 115 is movable fitted.

Each of the pins 114 is larger in width in the longitudinal direction as compared with the inter piece 115. The inter piece 115 is provided, at its upper and lower edges, with projecting edge portions 115a, 115b which are projected toward the pin 114.

In FIG. 7, reference signs A and B represent lines (points in a sectional view) where the pin 114 is in contact with the inter piece 115 in a rectilinear part of the chain 101, and a distance between A and B is a pitch.

Comparing the long pitch link 111 with the short pitch link 110 which is shown in FIG. 7 and FIG. 8(a), a length of a pillar part 122 existing between the front insertion part 112 and the rear insertion part 113 is longer in the back and force direction than a pillar part 121 existing between the front insertion part 112 and the rear insertion part 113 of the short pitch link 110 by a difference between the pitch lengths, as shown in FIG. 8(b), while shapes of the insertion parts 112, 113 are the same in both the links. The two types of the links 110, 111 are arranged over the entire length of the chain 101 in a determined arrangement pattern (random arrangement).

Relation between a radius of curvature RS of a face of the short pitch link 110 at an inner diameter side of the chain which is shown in FIG. 8(a) and a radius of curvature RL of a face of the long pitch link 111 at the inner diameter side of the chain which is shown in FIG. 8(b) is set to be $RA \leq RS \leq 1.5RA$, and $RS < RL$, provided that a radius of the pulley shaft 102e as shown in FIG. 9 is RA.

On occasion of coupling the links 110, 111 which are arranged in the lateral direction of the chain, the links 110, 111 are superposed on one another such that the front insertion part 112 of one of the links 110, 111 is opposed to the rear insertion part 113 of the other link 110, 111. Then, the pin 114 is fixed to the rear insertion part 113 of the one link 110, 111 and movably fitted to the front insertion part 112 of the other link 110, 111, while the inter piece 115 is movably fitted to the rear insertion part 113 of the one link 110, 111 and fixed to the front insertion part 112 of the other link 110, 111. When the pins 114 and the inter pieces 115 relatively move in rolling contact with each other, the links 110, 111 can be flexed to each other in the longitudinal direction thereof (in the back and forth direction).

As shown in FIG. 7, in a boarder part between the pin fixing part 118 and the inter piece movable part 119 of the link 110 (the link 111 too), there are provided upper and lower convex arc-shaped holding parts 118a, 118b for holding the pin 114 which is fixed to the pin fixing part 118. These convex arc-shaped holding parts 118a, 118b are respectively continued to upper and lower concave arc-shaped guide parts 119a, 119b of the inter piece movable part 119. In the same manner, in a boarder part between the inter piece fixing part 117 and the pin movable part 116, there are provided upper and lower convex arc-shaped holding parts 117a, 117b for holding the inter piece 115 which is fixed to the inter piece fixing part 117. These convex arc-shaped holding parts 117a, 117b are respectively continued to upper and lower concave arc-shaped guide parts 116a, 116b of the pin movable part 116.

An orbit of a contact position between the pin 114 and the inter piece 115 on the basis of the pin 114 is formed as an involute of circle. In this embodiment, a contact face of the pin 114 has an involute shape having a basic circle of a radius Rb and a center M, in a sectional view, and a contact face of the inter piece 115 is formed as a flat face (a rectilinear line in a sectional view). Accordingly, when the links 110, 111 are shifted from a rectilinear part to a curved part of the chain 101 or from the curved part to the rectilinear part, in the front insertion part 112, the pin 114 moves within the pin movable part 116 with respect to the inter piece 115 in a fixed state, while its contact face is kept in rolling contact (including a small sliding contact) with the rolling contact face of the inter piece 115. In the rear insertion part 113, the inter piece 115 moves within the inter piece movable part 119 with respect to the pin 114 in a fixed state, while its contact face is kept in rolling contact (including a small sliding contact) with the contact face of the pin 114.

In the above described power transmission chain 101, multangular vibrations occur due to repeated vertical movements of the pins, which is a factor responsible for noises. However, in this embodiment, because the pin 114 and the inter piece 115 relatively move in rolling contact with each other, and the orbit of the contact position between the pin 114 and the inter piece 115 on the basis of the pin 114 has the involute of circle, the vibrations can be made smaller as compared with a case where both the contact faces of the pin and the inter piece are formed as arc-shaped faces, whereby noises can be reduced. Further, because the two types of the links 110, 111 having the different pitch lengths are randomly arranged, cycles of generating striking sounds are shifted, and energy of the sounds are dispersed to different frequency zones, whereby a peak of sound pressure level is lowered. In this manner, the above described noise reducing effect is further enhanced.

This power transmission chain 101 can be produced by press fitting the links 110, 111 one by one or several sheets in lump, after the pins 114 and the inter pieces 115 of a required number have been vertically held on a table. This press fitting is conducted between the upper and lower edges of the pin 114 and the inter piece 115 and the upper and lower edges of the pin fixing part 118 and the inter piece fixing part 117, and a press fitting allowance is set to be 0.005 mm to 0.1 mm. A tension is applied (pre-tension) to the chain 101 which has been assembled in this manner.

Figure 10:
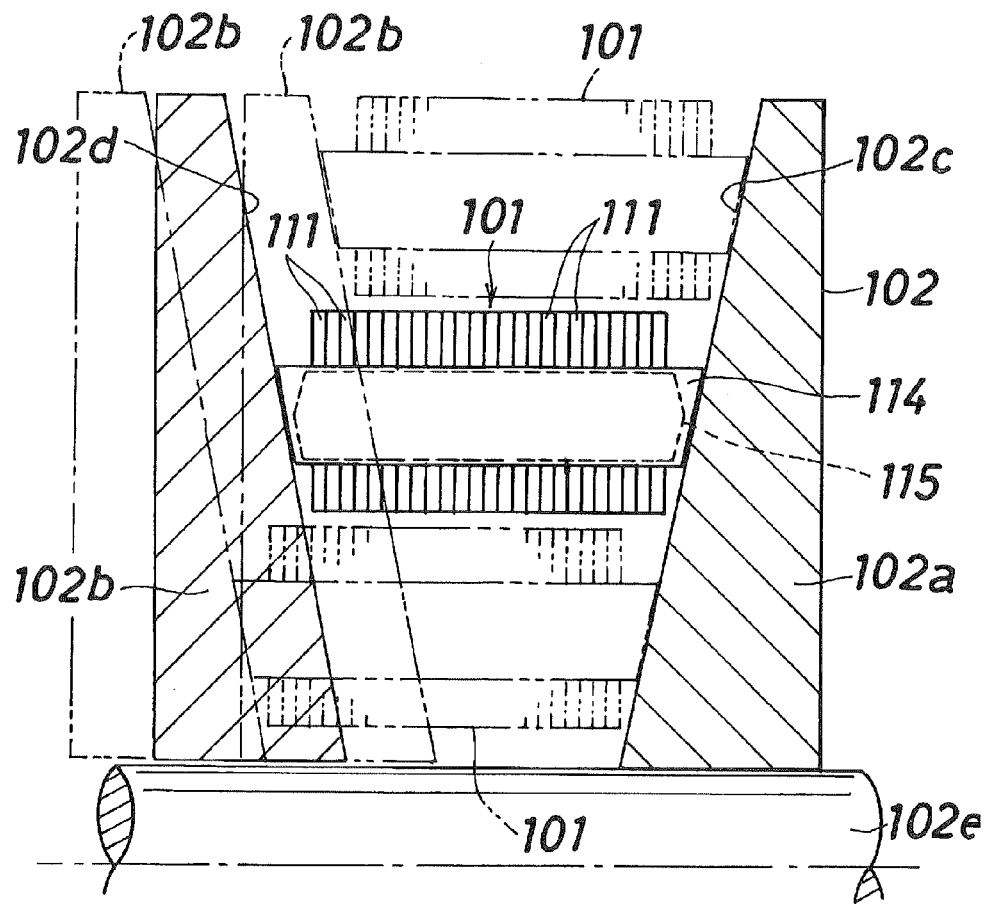
FIG. 10 is a front view showing the power transmission chain in the state mounted to the pulley.

The above described power transmission chain is used in the CVT as shown in FIG. 12. On this occasion, in a state where the end face of the inter piece 115 is not in contact with the respective conical sheave faces 102c, 102d of the fixed sheave 102a and the movable sheave 102b of the pulley 102, as shown in FIG. 10, the end face of the pin 114 is brought into contact with the conical sheave faces 102c, 102d of the pulley 102, and the power is transmitted with friction force of this contact. Because the pin 114 and the inter piece 115 are guided by the respective movable parts 116, 119 to move in rolling contact, as described above, the pin 114 is hardly rotated with respect to the sheave faces 102c, 102d of the pulley 102, and friction loss is reduced, whereby high power transmission rate can be secured. When the movable sheave 102b of the drive pulley 102 at a position shown by a solid line is moved close to and away from the fixed sheave 102a, a winding diameter of the chain 101 becomes larger when it has moved close to the fixed sheave 102a, and becomes smaller when it has moved away from the fixed sheave 102a, as shown by a chain line in FIG. 10. In the driven pulley 103, although not shown in the drawing, the movable sheave of the driven pulley 103 moves in an opposite direction to the movable sheave 102b of the drive pulley 102. When the winding diameter of the drive pulley 102 becomes larger, the winding diameter of the driven pulley 103 becomes smaller, and when the winding diameter of the drive pulley 102 becomes smaller, the winding diameter of the driven pulley 103 becomes larger. As the results, on the basis of a state where transmission ratio is 1:1 (an initial value), a state of U/D in which the winding diameter of the drive pulley 102 is the smallest and the winding diameter of the driven pulley 103 is the largest is obtained, and a state of O/D in which the winding diameter of the drive pulley 102 is the largest and the winding diameter of the driven pulley 103 is the smallest is obtained.

Figures 11A, 11B:
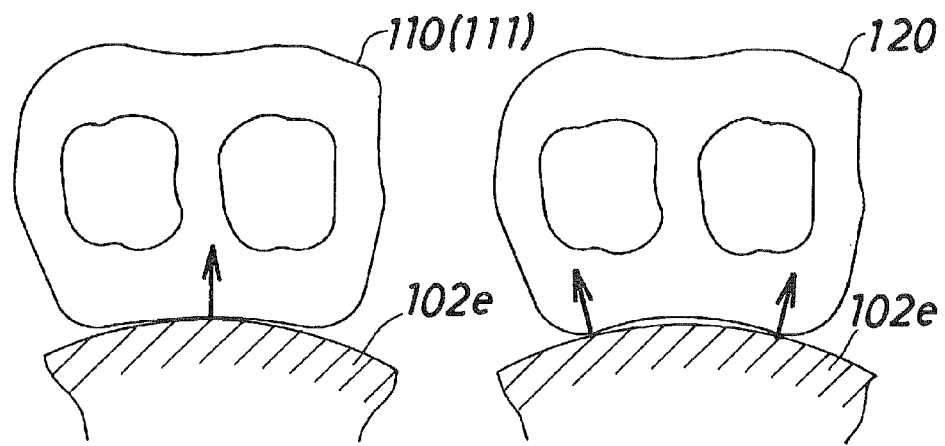
FIGS. 11(a) and 11(b) are views schematically showing the links in a state where they interfere with the pulley shaft.

When the winding diameter of the drive pulley 102 is the smallest in FIG. 10, a clearance between the face of the link 110, 111 at the inner diameter side of the chain and the pulley shaft 102e is small, as also shown in FIG. 9. Therefore, there is such possibility that the face of the link 110, 111 at the inner diameter side of the chain may interfere with the pulley shaft 102e, when an unusual force is exerted on the chain due to inertia at a time of driving the chain. In case where the face of the link 110, 111 at the inner diameter side of the chain interferes with the pulley shaft 102e, the link 101, 111 comes into contact with the pulley shaft 102e at one point, as shown in FIG. 11(a), because the relation between the radius of curvature RS of the face of the short pitch link 110 at the inner diameter side of the chain and the radius of curvature RL of the face of the long pitch link 111 at the inner diameter side of the chain is set to be RA≦RS≦1.5RA, and RS<RL, provided that the radius of the pulley shaft 102e is RA. Therefore, bending moment will not be exerted on the link 110, 111, and strong interference between the link 110, 111 and the pulley shaft 102e can be avoided, by moving the entire link 110, 111 in a direction of the force. On the contrary, in the conventional chain as shown in FIG. 11(b), the link 120 comes into contact with the pulley shaft 102e at two points, and there is such possibility that concentration of stress may occur in the link 120 due to a bending moment. In this manner, in the power transmission chain according to the invention, by considering the shape of the face of the link 110, 111 at the inner diameter side of the chain, the strong interference when the link 110, 111 interferes with the pulley shaft 102e is prevented. As the results, it is possible to enhance durability of the chain 101.

The invention claimed is:

1. A power transmission device comprising:
a first pulley having a conical sheave face, a second pulley having a conical sheave face, and
a power transmission chain suspended between the first and second pulleys,
wherein said power transmission chain includes the power transmission chain comprising:
a plurality of links respectively having front and rear insertion parts into which pins are inserted,
a plurality of first pins and a plurality of second pins which are arranged in front and back for connecting the links which are arranged in a lateral direction of the chain such that the front insertion part of one of the links is opposed to the rear insertion part of the other link, the first pins and the second pins being relatively moved in rolling contact with each other, whereby the links can be flexed with respect to each other in a longitudinal direction, said power transmission chain being suspended between a pair of pulleys,
wherein a plurality of the links includes two types of the links having different pitch lengths, wherein provided that a radius of a pulley shaft is RA, a radius of curvature of a face of the link having a shorter pitch length at an inner diameter side of the chain is RS, and a radius of curvature of a face of the link having a longer pitch length at an inner diameter side of the chain is RL, relation is set to be RA≦RS≦1.5RA, and RS<RL.

\* \* \* \* \*